(12) United States Patent
Li

(10) Patent No.: US 11,483,982 B2
(45) Date of Patent: Nov. 1, 2022

(54) PLANTING STRUCTURE CAPABLE OF CONTROLLING GROWTH CONDITIONS AND RECYCLING NUTRIENT SOLUTION

(71) Applicant: Wen-Hao Li, Taichung (TW)

(72) Inventor: Wen-Hao Li, Taichung (TW)

( * ) Notice: Subject to any disclaimer, the term of this patent is extended or adjusted under 35 U.S.C. 154(b) by 681 days.

(21) Appl. No.: 15/967,601

(22) Filed: May 1, 2018

(65) Prior Publication Data

US 2019/0335679 A1 Nov. 7, 2019

(51) Int. Cl.
*A01G 27/00* (2006.01)
*A01G 9/02* (2018.01)
*A01G 29/00* (2006.01)
*A01G 9/24* (2006.01)

(52) U.S. Cl.
CPC ............ *A01G 9/021* (2013.01); *A01G 9/027* (2013.01); *A01G 9/247* (2013.01); *A01G 29/00* (2013.01); *A01G 9/022* (2013.01)

(58) Field of Classification Search
CPC . A01G 9/00; A01G 9/02; A01G 9/021; A01G 9/022; A01G 9/023; A01G 9/247; A01G 31/00; A01G 31/06; A01G 2031/006; A01G 27/00; A01G 27/005; A01G 27/006
See application file for complete search history.

(56) References Cited

U.S. PATENT DOCUMENTS

| | | | | | |
|---|---|---|---|---|---|
| 3,543,437 | A | * | 12/1970 | Gaines, Jr. ............. | A01G 31/00 47/59 R |
| 3,550,319 | A | * | 12/1970 | Gaines, Jr. ............. | A01G 31/02 47/79 |
| 4,324,069 | A | * | 4/1982 | Flagg .................... | A01G 27/001 47/62 E |
| 4,825,588 | A | * | 5/1989 | Norman .................... | A01G 9/02 119/61.1 |
| 4,860,490 | A | * | 8/1989 | Morris .................... | A01G 31/02 47/63 |
| 4,899,487 | A | * | 2/1990 | Brownlee ............. | A47F 7/0071 47/41.01 |
| 5,010,686 | A | * | 4/1991 | Rivest .................... | A01G 31/02 47/62 C |
| 5,177,899 | A | * | 1/1993 | Powell .................... | A01G 9/02 248/214 |
| 5,299,384 | A | * | 4/1994 | Andrews .................. | A01G 9/02 47/66.5 |
| 5,826,375 | A | * | 10/1998 | Black ..................... | A01G 9/023 47/67 |
| 5,852,895 | A | * | 12/1998 | Sinanan ................. | A01G 9/022 47/33 |

(Continued)

*Primary Examiner* — Monica L Perry
*Assistant Examiner* — Michael A. Fabula
(74) *Attorney, Agent, or Firm* — Che-Yang Chen; Law Office of Michael Chen

(57) ABSTRACT

A planting structure includes a trough and a plurality of lateral covers. The trough has a hollow space and a planting space, and a canal is formed inside of the trough; the lateral covers cover a lateral side of the trough and seals off the planting space. The inner walls on the two sides have bottom ends thereof integrally extended to form the canal therebetween. In addition, the planting structure possesses features such as being light in weight, easy to assemble and operate, and can be used to effectively lower production costs by modifying the length and the arrangement mode of the structure according to requirements.

16 Claims, 11 Drawing Sheets

(56) References Cited

U.S. PATENT DOCUMENTS

| | | | | |
|---|---|---|---|---|
| 5,879,071 A * | 3/1999 | Sanford, Jr. | | A01G 9/02 362/101 |
| 6,216,390 B1 * | 4/2001 | Peregrin Gonzalez | | A01G 31/02 47/62 R |
| 8,950,113 B1 * | 2/2015 | Schall | | B65D 25/06 47/85 |
| 9,149,006 B1 * | 10/2015 | Pope | | A01G 9/027 |
| 9,585,312 B1 * | 3/2017 | Klinicki | | A01G 9/02 |
| 9,839,183 B2 * | 12/2017 | Chang | | A01G 9/025 |
| 10,492,379 B1 * | 12/2019 | Meyer | | A01G 13/0231 |
| 10,492,385 B2 * | 12/2019 | West | | A01G 27/005 |
| 2003/0005625 A1 * | 1/2003 | Reichert | | A01G 9/023 47/65.5 |
| 2005/0120626 A1 * | 6/2005 | Prescott | | A01G 9/02 47/81 |
| 2006/0191196 A1 * | 8/2006 | Cochran | | A01G 9/02 47/66.1 |
| 2008/0098650 A1 * | 5/2008 | Lee | | A01G 31/06 47/58.1 R |
| 2009/0031629 A1 * | 2/2009 | Riesterer | | A01G 9/02 47/66.7 |
| 2009/0300984 A1 * | 12/2009 | Gordon | | A01G 27/005 47/66.7 |
| 2010/0313474 A1 * | 12/2010 | Williams | | A01G 9/023 47/65.7 |
| 2011/0247267 A1 * | 10/2011 | Lutzke | | A01G 9/02 47/65.7 |
| 2012/0174481 A1 * | 7/2012 | Toro | | A01G 9/02 47/86 |
| 2013/0014436 A1 * | 1/2013 | Shepps | | A01G 9/027 47/65.7 |
| 2013/0047507 A1 * | 2/2013 | Tinapple | | A01G 27/003 47/81 |
| 2014/0338261 A1 * | 11/2014 | Sykes | | A01G 31/06 47/62 A |
| 2015/0068122 A1 * | 3/2015 | Juncal | | A01G 31/02 47/62 A |
| 2015/0089864 A1 * | 4/2015 | Aronow | | A01G 9/00 47/33 |
| 2015/0201563 A1 * | 7/2015 | Chiang | | A47G 7/041 47/86 |
| 2015/0208593 A1 * | 7/2015 | Aronow | | A01G 9/28 47/65.5 |
| 2018/0000026 A1 * | 1/2018 | West | | A01G 9/023 |
| 2018/0014484 A1 * | 1/2018 | Yoshida | | A01G 31/02 |
| 2018/0103599 A1 * | 4/2018 | Zhan | | A01G 31/02 |
| 2018/0317411 A1 * | 11/2018 | Spiro | | A01G 9/0293 |
| 2018/0325038 A1 * | 11/2018 | Spiro | | A01G 27/001 |
| 2019/0230878 A1 * | 8/2019 | Albert | | A01G 31/06 |
| 2019/0254241 A1 * | 8/2019 | Woerner | | A01G 31/06 |
| 2020/0154659 A1 * | 5/2020 | Craig | | A01G 7/045 |

* cited by examiner

PLANTING STRUCTURE CAPABLE OF CONTROLLING GROWTH CONDITIONS AND RECYCLING NUTRIENT SOLUTION

FIELD OF THE INVENTION

The present invention relates to a planting structure. More particularly, the present invention relates to a planting structure capable of directly performing cycled transmissions of a nutrient solution, moisture or a gas so as to control a growth environment and promote crop growth, effectively reducing weight without affecting a strength thereof, and lowering agricultural production costs and is easy to assemble.

BACKGROUND OF THE INVENTION

Generally, the issue of land pollution is becoming increasingly grave along with the development of economy and the changes in the environment. Further, the application of chemical fertilizers not only influences the agricultural plantation but also affects the human health once the fertilizers enter the food chains. In addition, the leaf vegetables are the most susceptible to the absorption of pollutants due to their short growth periods and short roots. Also, since the leaf vegetables are directly planted on the agricultural land, it led to problems like the inconvenience in cleaning the vegetables after harvesting, the susceptibility to the influences of weather and the difficulty in accurately controlling the growth speed. Therefore, the new farming method of the indoor above-ground cultivation system has been extensively applied to the plantation of the leaf vegetables in recent years.

Nowadays, the design of the common above-ground cultivation systems are mostly well suited for a single type of plantation mode, for example, the hydroponic plantation structures often have their structures constructed by using a cycling pipeline, and placing the crops on a body of the pipeline; the root portions of the crops can be planted in water, such that the nutrient solutions in the water can be absorbed by the root portions of the crops. Thus, the growth of the crops can be controlled, and the quality of the nutrients absorbed by the crops can be ensured and thus preventing unnecessary pollutions; and the systems gradually become an important farming method for the leaf vegetables.

The other traditional and commonly seen above-ground plantation method is to use layered racks to construct a support platform, and place multiple pot-shaped vessels on the support platform. Just like growing a plant in a pot, a planting medium is firstly filled in the vessel, and then a seedling of a crop is planted in the planting medium, followed by multiple times of watering and illumination from sunlight subsequently for facilitating photosynthesis and promoting crop growth. The planting medium is sprinkled with water or a nutrient solution, such that an environment that can facilitate moisture and nutrient absorption by the root portion of the crop can be made by the storage and conversion of nutrients in the planting medium.

However, the weather resistance of the leaf portion and the root portion of a crop are different. Generally speaking, the leaf portion of the tropical crops or the subtropical crops can withstand a temperature of approximately up to 40° C. and still grow slowly, but such a temperature may cause the root portion of the crops to gradually wither or become rotten. In contrast, greenhouses are used to cultivate crops in frigid zones under 0° C., but even if it is possible to use the greenhouses to produce a limited effect of temperature preservation, it is still difficult to control an environment that is beneficial to the growth of the root portions of the crops, and consequently causing the growth of the crops to be unproductive.

The existing above-ground cultivation systems are mostly designed to make an environment which is beneficial to the absorption of moisture and nutrients by the root portions of crops, but cannot truly satisfy the actual requirement of growth. Generally, the temperature of the planting medium suitable for the growth of the root portions of crops is between 12° C. to 28° C., in which slight variations are present in the temperatures of the root portions of crops due to the difference in the types of the planted crops. The existing technology of the above-ground cultivation systems is more susceptible to the influence of external temperatures, and subsequently leading to conditions such as excessively low temperature or humidity in winter or excessively high temperature and humidity in summer; therefore, temperature preservation or heat dissipation are generally dependent on greenhouses, such that the environmental temperature in the greenhouses can be adjusted to facilitate the growth of crops, but it cannot be used to effectively control the environmental temperature required for the growth of the root portions of crops, and thus cannot truly satisfy the actual requirement and has problems like having the difficulty to control the farming environment. That is, these are the issues for people in the relevant industries, who are urgently seeking a solution therefor.

The structural design of the conventional above-ground plantation is formed by having a solid-core overall body, even though this provides sufficient overall strength, but also leads to a heavier overall weight in comparison, and consequently causing the installation and construction thereof to be inconvenient and complicated, and is hard to be assembled and operated. More importantly, the above-ground plantation structure and functional differences further limit the types of the crops that can be planted, and also lack the environmental control effect for the root portions and subsequently affecting the growth of crops.

In light of such problems, the inventor has thoroughly investigated the issues faced by the aforesaid existing above-ground cultivation systems, and proactively seeks a solution from years of experience in the development, research and production of the relevant industry, and finally successfully developed a planting structure after continuous researching and trials, which aims to overcome the drawbacks and inconvenience caused by the difficulty in the existing plantation systems in controlling the growth environment required by the root portions of crops.

SUMMARY OF THE INVENTION

To effectively solve the aforementioned problems, a primary objective of the present invention is to provide a planting structure capable of controlling growth conditions like temperature and humidity in a planting space thereof, recycling a nutrient solution and excessive moisture, thereby promoting growth of a crop or a plant, and is also capable of protecting the crop, lowering agricultural production costs and increasing yields.

Another objective of the present invention is to provide a planting structure capable of enabling cycled flows of moisture, a nutrient solution or a beneficial gas, so as to reduce unnecessary wastes and achieve environmental protection and energy-saving.

A further objective of the present invention is to provide a planting structure capable of effectively reducing a weight thereof without affecting a strength thereof.

A further objective of the present invention is to provide a planting structure capable of being designed differently according to a requirement of a crop, effectively lowering costs and is easy to assemble and operate.

To achieve the aforementioned objectives, the present invention provides a planting structure which comprises a trough and a plurality of lateral covers, wherein the trough has an outer wall and an inner wall respectively formed on two sides thereof; top portions of the outer walls integrally extend to top portions of the inner walls; the trough further has a bottom surface formed between bottom portions of the outer walls, and the bottom surface integrally extends to the bottom portions of the outer walls; the trough also has a hollow space formed between the outer walls, the inner walls and the bottom surface, and a planting space is formed in the trough between the inner walls on the two sides. The inner walls on the two sides have bottom ends thereof integrally extended to form a canal therebetween; in addition, the lateral covers cover a side of the trough and seal off the planting space. Accordingly, the planting structure is enabled to have an excellent temperature preservation effect and is able to block off an external temperature, so as to enable the planting space to be a growth environment beneficial to the growth of crops, and can effectively control conditions such as temperature and humidity required by root portions of the crops; further, a nutrient solution and excessive moisture can be recycled, thereby benefitting the crops or promoting the growth of the crops. In comparison to the conventional indoor organic cultivation, which is necessary to control the temperature and the humidity of the whole indoor space, the present invention only needs to control the pipelines with respect to the root portions of plants, and is easier to be controlled and achieve the effects of environmental protection and energy-saving, and further protecting the crops, lowering agricultural production costs and promoting the growth of the crops and increasing the yields. Moreover, the planting structure can achieve the effect of effectively reducing the weight without affecting the strength thereof via the design of the hollow space. Also, the planting structure can be designed differently according to a requirement of a crop and can effectively cut down the costs, and includes features like being light in weight and easy to assemble and operate, and can have the length and the arrangement mode thereof modified according to requirements. The planting structure does not require the development of different molds, thus effectively reducing production costs.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
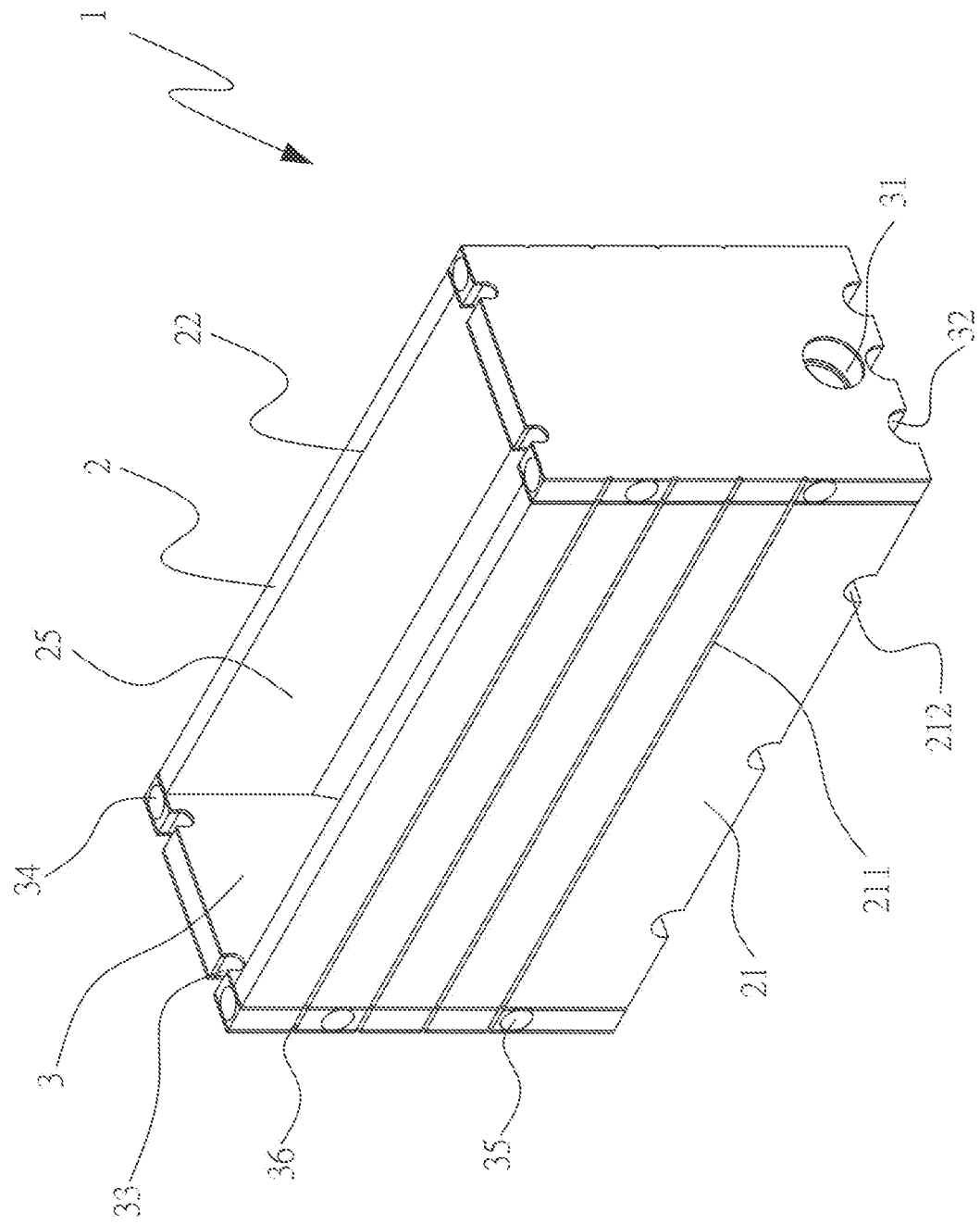
FIG. 1 is a stereoscopic assembled perspective view in accordance with a preferred embodiment of the present invention.
Figure 2:
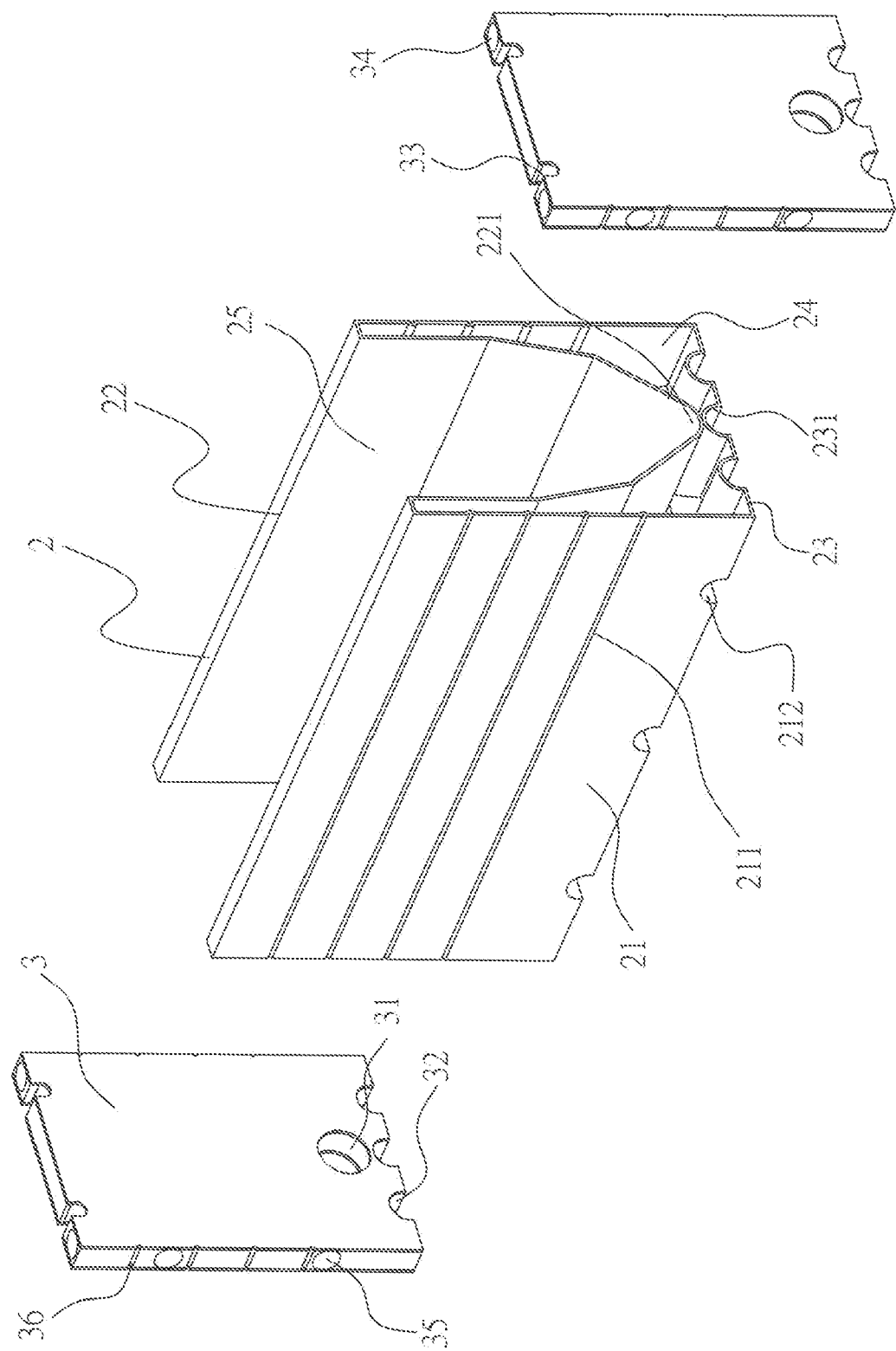
FIG. 2 is a stereoscopic exploded perspective view in accordance with a preferred embodiment of the present invention.
Figure 3:
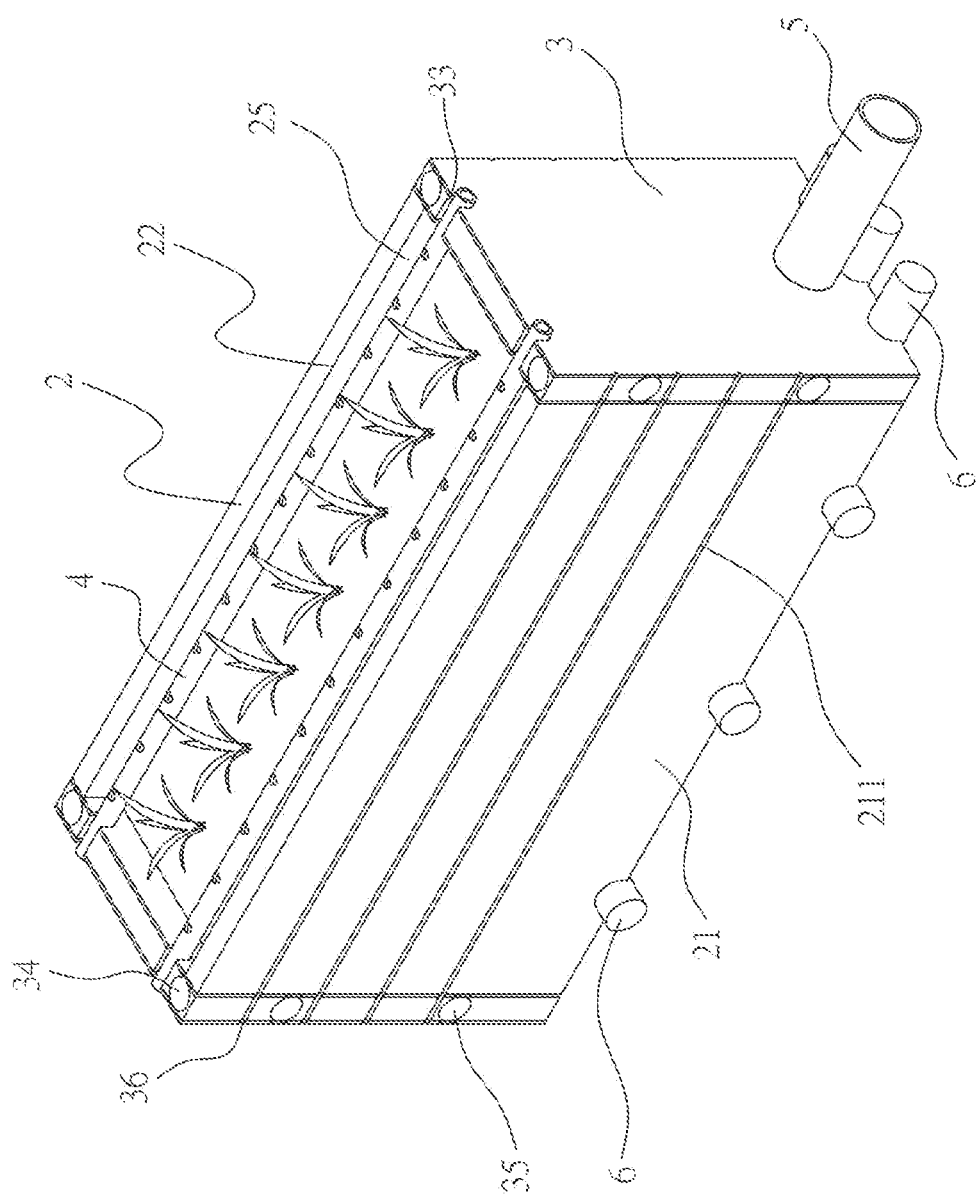
FIG. 3 is an implemented perspective view I in accordance with a preferred embodiment of the present invention.
Figure 4:
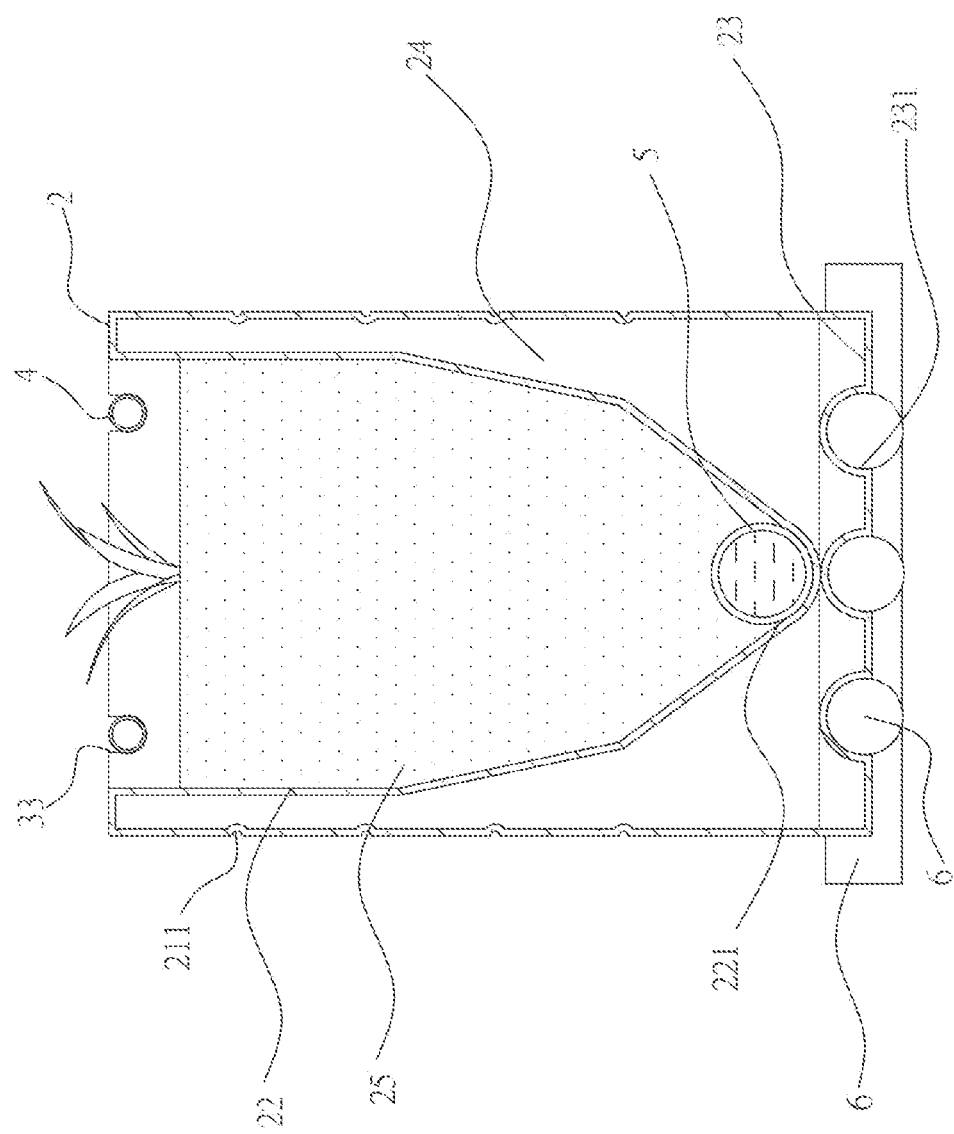
FIG. 4 is a dissected perspective view I in accordance with a preferred embodiment of the present invention.
Figure 5:
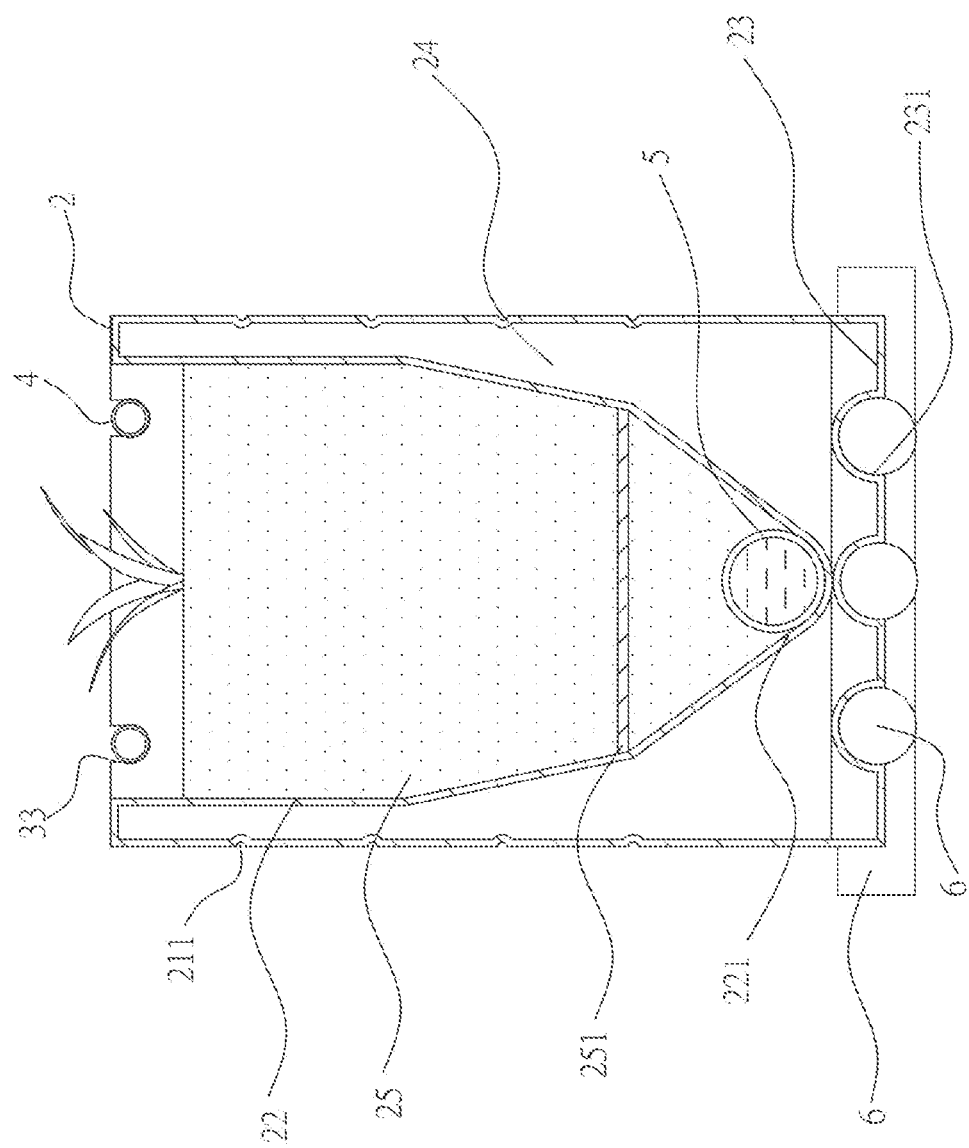
FIG. 5 is a dissected perspective view II in accordance with a preferred embodiment of the present invention.
Figure 6:
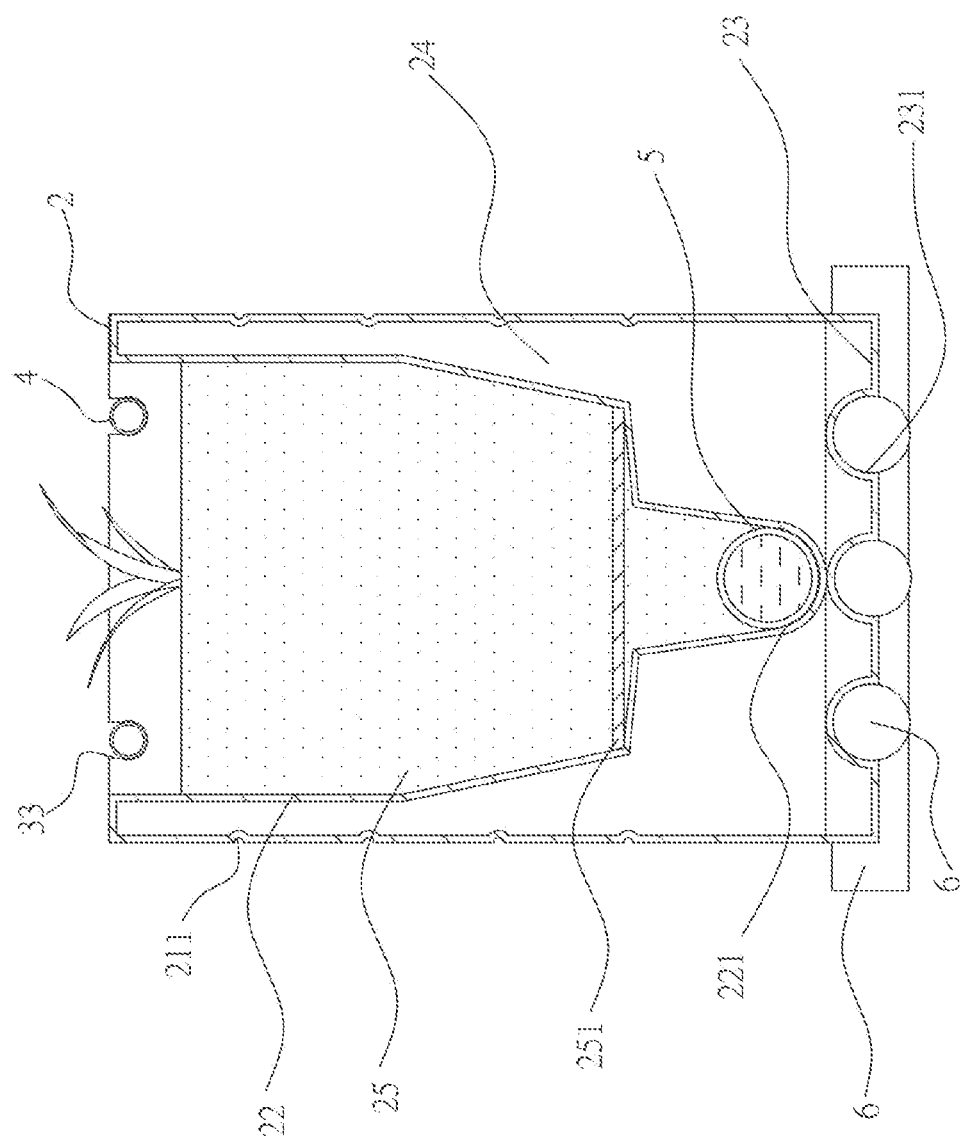
FIG. 6 is a dissected perspective view III in accordance with a preferred embodiment of the present invention.
Figure 7:
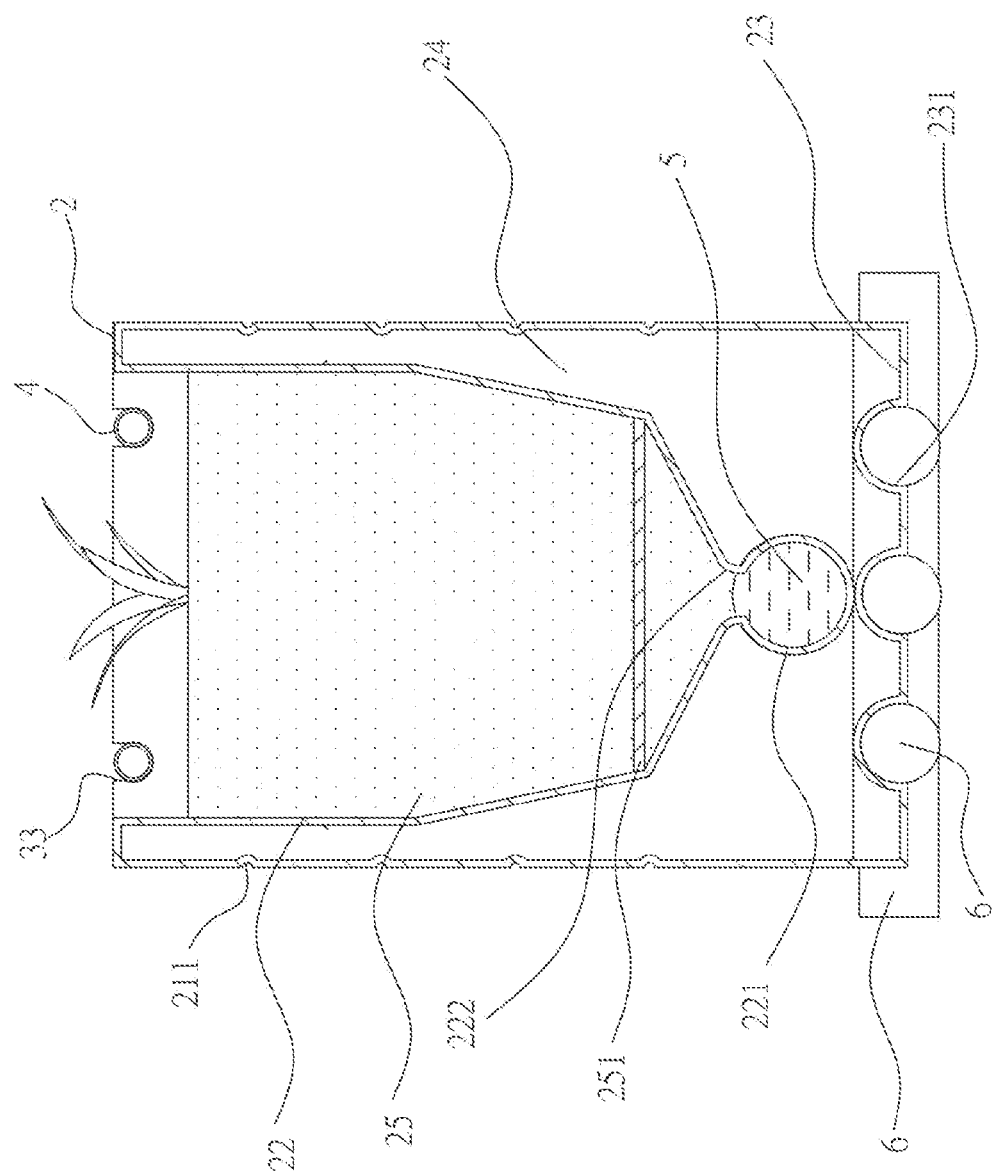
FIG. 7 is a dissected perspective view IV in accordance with a preferred embodiment of the present invention.
Figure 8:
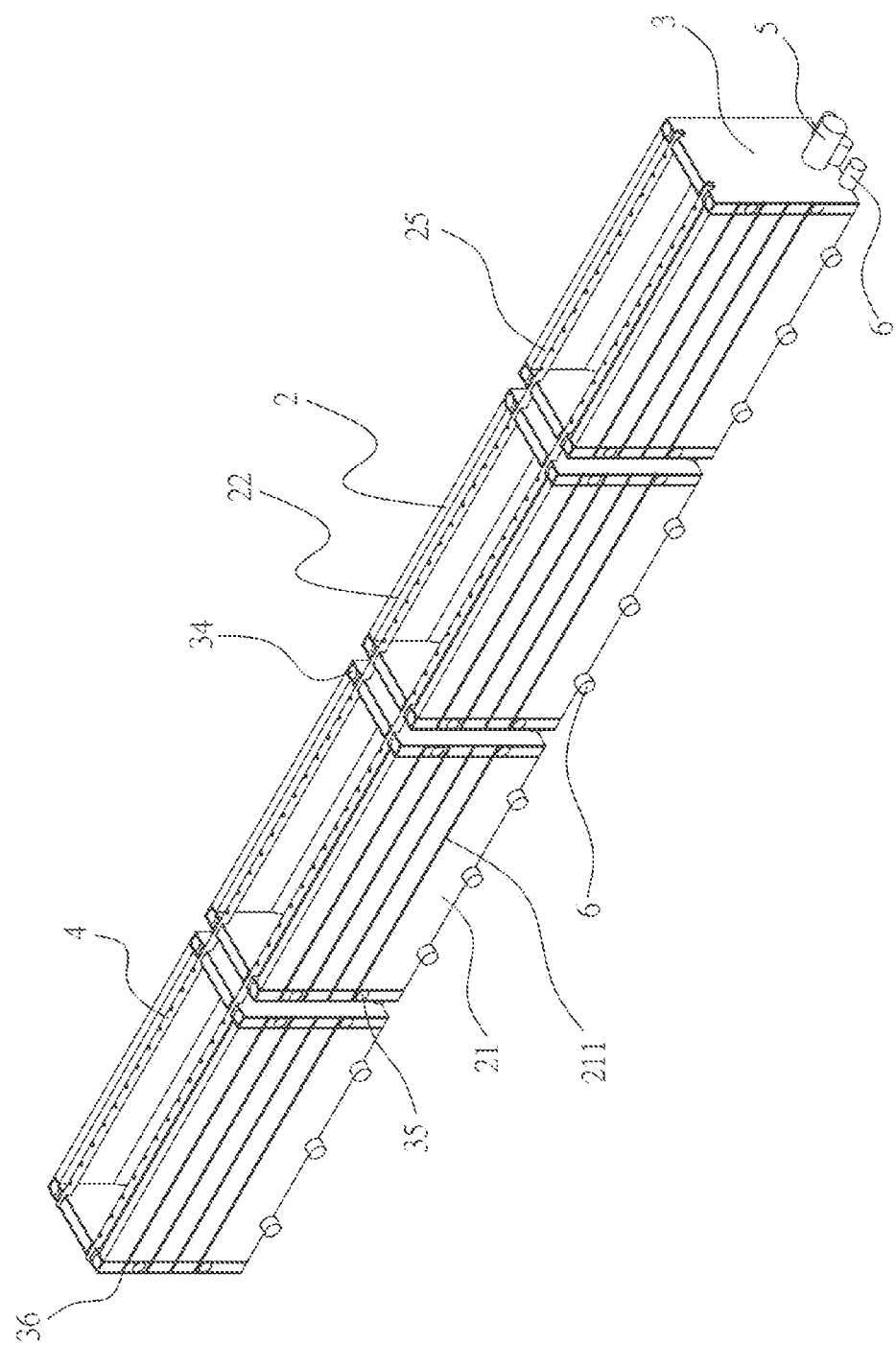
FIG. 8 is an implemented perspective view II in accordance with a preferred embodiment of the present invention.
Figure 9:
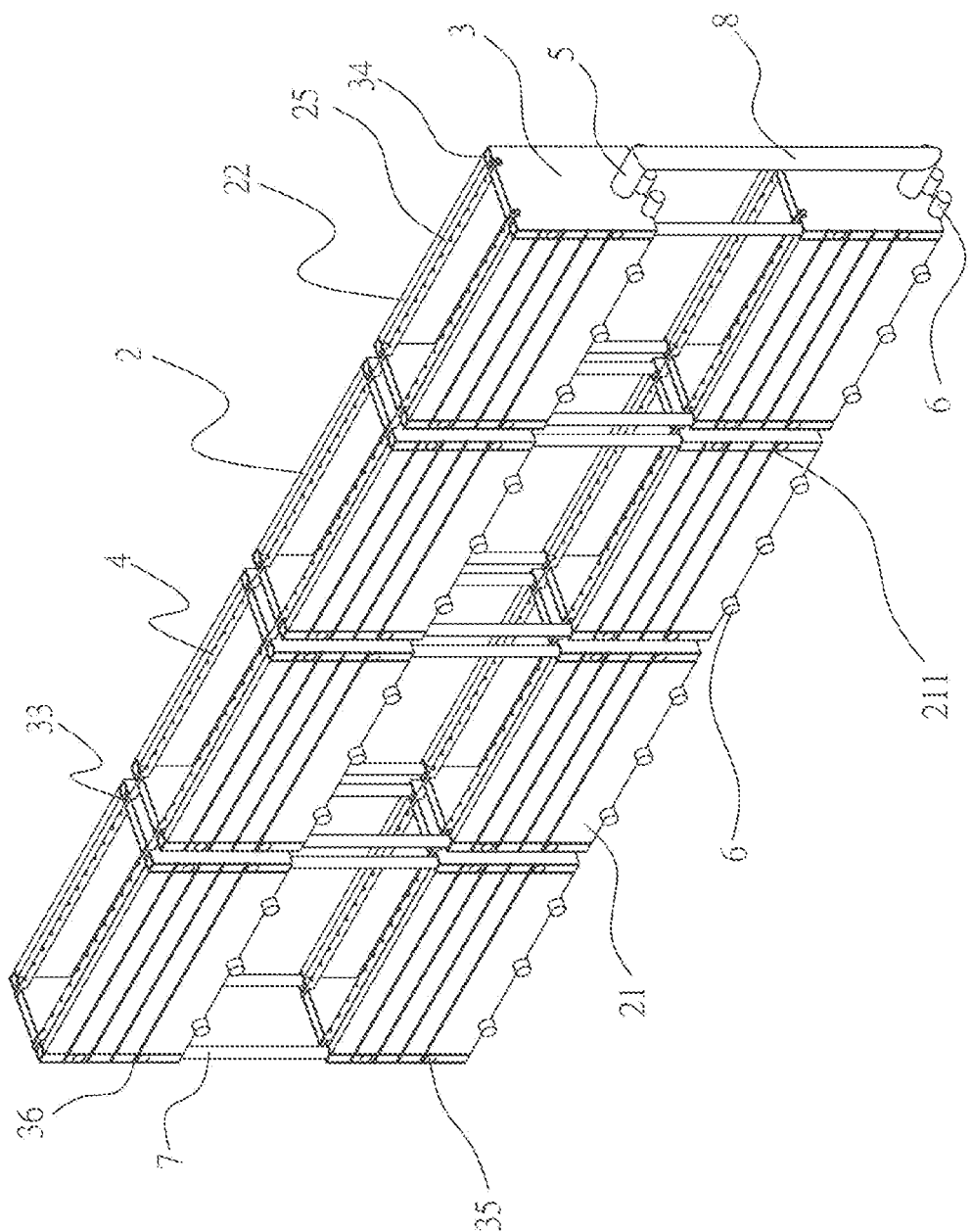
FIG. 9 is an implemented perspective view III in accordance with a preferred embodiment of the present invention.
Figure 10:
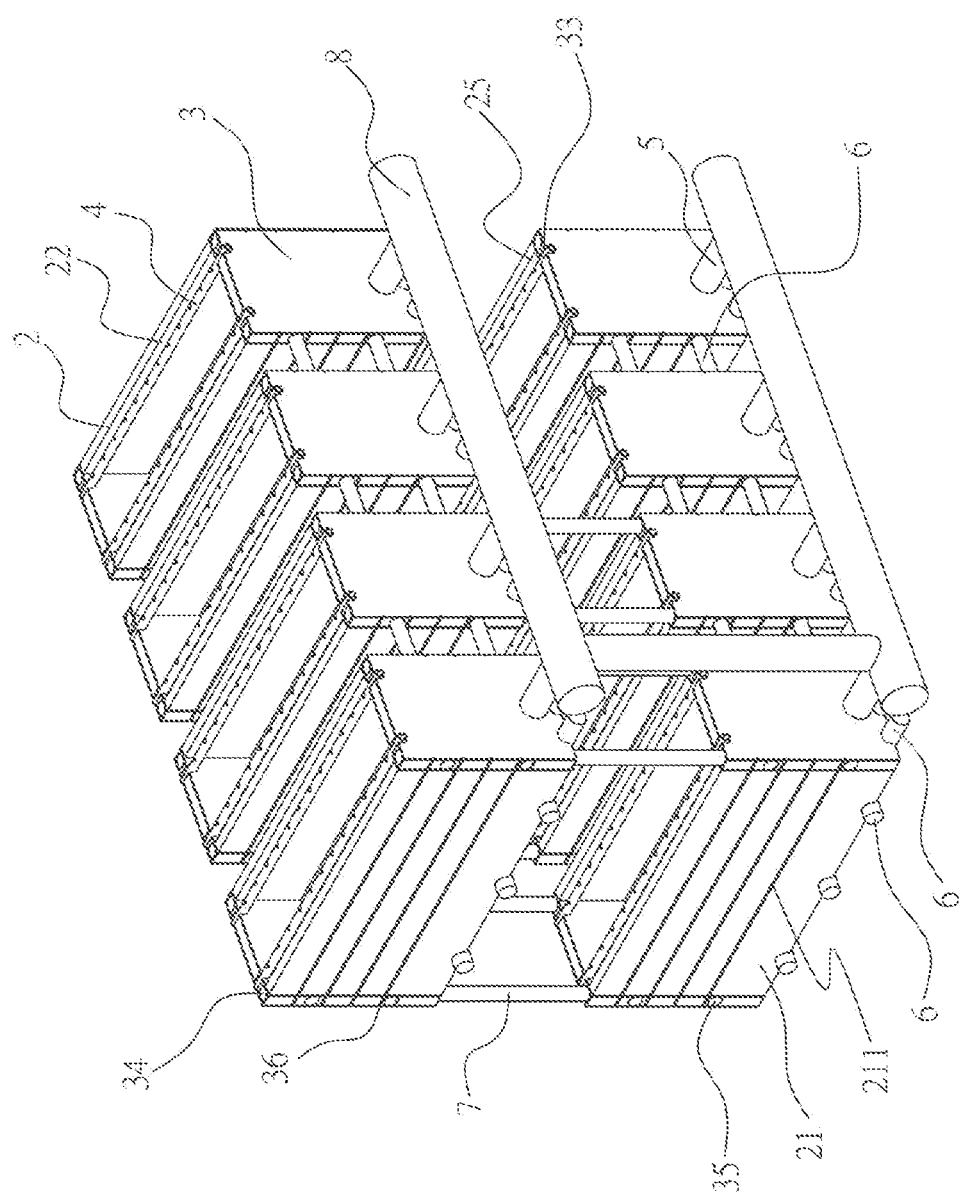
FIG. 10 is an implemented perspective view IV in accordance with a preferred embodiment of the present invention.
Figure 11:
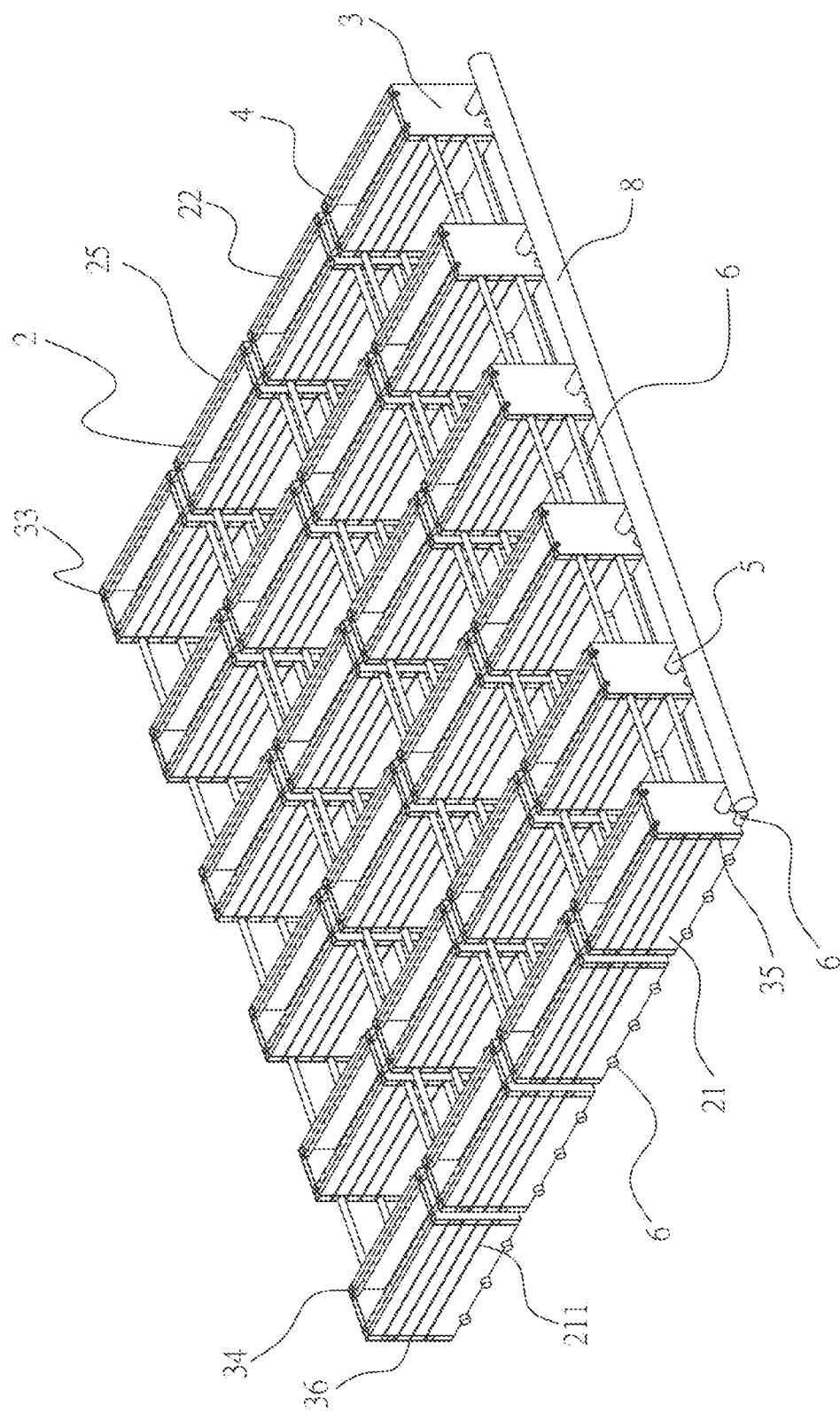
FIG. 11 is an implemented perspective view V in accordance with a preferred embodiment of the present invention.

Referring to FIG. 1 and FIG. 2, a stereoscopic assembled perspective view and a stereoscopic exploded perspective view show a preferred embodiment of the present invention. It can be clearly observed from the figures that the planting structure 1 comprises a trough 2 and a plurality of lateral covers 3, wherein the trough 2 has at least one outer wall 21, at least one inner wall 22 and a bottom surface 23. The outer wall 21 is formed on two sides of the trough 2, the inner wall 22 is also formed on the two sides of the trough 2, and top portions of the inner walls 22 are integrally extended to top portions of the outer walls 21. The bottom surface 23 is also integrally extended to bottom portions of the outer walls 21, and the trough 2 has a hollow space 24 formed between the outer walls 21, the inner walls 22 and the bottom surface 23. The trough 2 is integrally formed from a plastic material and has the hollow space 24 formed therein, or the trough 2 may be integrally formed from a foamed material or a lightweight material and has the hollow space 24 formed therein. In addition, the trough 2 has a planting space 25 formed between the inner walls 22 on the two sides, and the inner walls 22 on the two sides have bottom ends thereof integrally extended downwards to form a canal 221; the outer walls 21 have a plurality of recess portions 211 formed thereon, and at least one lateral groove 212 is formed between bottom portions of the outer walls 21, whereas a plurality of bottom grooves 231 are formed on the bottom surface 23. Further, the lateral covers 3 cover a side of the trough 2, and the lateral covers 3 can be assembled on two sides of the trough 2 or be integrally formed with the trough 2. Each of the lateral covers 3 has a through hole 31 and a plurality of intercommunicated grooves 32 formed thereon; the through hole 31 faces the canal 221 and can be mutually assembled therewith, and the intercommunicated grooves 32 can be mutually assembled with the bottom grooves 231. The lateral groove 212 and the intercommunicated grooves 32 are configured to be mutually intersected on the bottom surface 23; each of the lateral covers 3 further has a plurality of top grooves 33, at least one shaft opening 34, at least one transverse opening 35 and a plurality of recessed grooves 36 formed thereon, in which the top grooves 33 are formed on a top portion of the lateral covers 3, and the recessed grooves 36 can be mutually assembled with the recess portions 211.

Referring to the aforesaid figures and FIG. 3 to FIG. 7, an implemented perspective view I and dissected perspective views I to IV show a preferred embodiment of the present invention. The planting structure 1 can have various plantation modes such as substrate cultivation, soil cultivation, hydroponic cultivation, aeroponic cultivation or drip farming applied thereto. The planting space 25 between the inner walls 22 on the two sides can have at least one mesh plate 251 mounted therein, and the inner walls 22 on the two sides can be extended in a gradually narrowing manner to the canal 221, or initially extended inwards almost horizontally and then extended in the gradually narrowing manner to the canal 221. Alternatively, the canal 221 can have an intercommunicated duct 222 formed thereon, and all of the extension manners of the inner walls 22 are capable of enabling the planting space 25 to be extended to the canal 221. In addition, the trough 2 has at least one sprinkling pipeline 4 mounted thereon, and the sprinkling pipeline 4 is provided in the top grooves 33 of the lateral covers 3 on the two sides. The trough 2 has the hollow space 24 formed between the outer walls 21, the inner walls 22 and the bottom surface 23, and the trough 2 is integrally formed from a plastic material and has the hollow space 24 formed therein; therefore, an overall weight of the trough 2 can be effectively reduced without affecting a strength thereof. The outer walls 21 have the recess portions 211 formed thereon and each of the lateral covers 3 has the recessed grooves 36 formed thereon; the recess portions 211 and the recessed grooves 36 can effectively reinforce the overall strength of the trough 2. After filling the planting space 25 with a planting medium like soils or a medium and cultivating a crop, liquids such as water, a nutrient solution or a medicament can be irrigated into the canal 221, or the through hole 31 on each of the lateral covers 3 can be mounted with an intercommunicated pipe 5, such that the liquids such as the water, the nutrient solution or the medicament can be irrigated into the canal 221 via the intercommunicated pipe 5, and water vapor resulted from evaporation of the liquids flowing in the canal 221 moves towards the planting space 25 via the intercommunicated duct 222, and then becomes absorbed by the root portions of the crops in the planting space 25, such that the root portions of the planted crops can directly absorb the water, the nutrients or the medicinal ingredients in the canal 221. Moreover, the root portions are well ventilated, thus effectively preventing diseases to the root portions and intensifying the absorption ability of the root portions, thereby promoting the growth of the crops effectively. If a crop that is not resistant to high temperature is planted, a low-temperature liquid can be provided in the canal 221 for assisting the crop to grow stably, and if a crop that is not resistant to low temperature is planted, a high-temperature liquid can be provided in the canal 221 for equivalently assisting the crop to grow stably, thereby solving the issues of high energy consumption and costs caused by the need to control the overall temperature and humidity in the whole indoor area, and the lowering of temperature or the need for ventilation in the surrounding environment. That is, it is only necessary to control the pipelines with respect to the root portions of plants, and thus the pipelines are easier to control and more energy-saving. In addition, the trough 2 has an effect of temperature preservation and is capable of controlling the growth conditions including temperature and humidity in the planting space 25 and recycling the nutrient solution and excessive moisture, thereby benefitting the crops or promoting the growth of the crops and achieving environmental protection and energy-saving, and achieving effects including crop protection, a reduction in the agricultural production costs and increasing yields.

Referring to the aforesaid figures and FIG. 8 to FIG. 11, implemented perspective views II to V show a preferred embodiment of the present invention, wherein the plurality of planting structures 1 can be mutually assembled with each other horizontally and vertically. When the planting structures 1 are to be horizontally and linearly connected in series, the adjacent planting structures 1 can be assembled via the intercommunicated pipe 5, such that the canal 221 between each of the planting structures 1 are intercommunicated, and the bottom groove 231 is intercommunicated with the intercommunicated grooves 32, wherein each of the intercommunicated grooves 32 has an end of a transverse rod 6 provided thereon, and the transverse rod 6 is also assembled with the bottom groove 231 and the intercommunicated groove 32 of the other lateral cover 3 at the same time. When the planting structures 1 are to be horizontally and transversely connected in series, the transverse opening 35 on each of the lateral covers 3 can be provided with one end of at least one transverse rod 6, whereas another end thereof is assembled with the transverse opening 35 of the other lateral cover 3. Or when the planting structures 1 are to be vertically assembled, the shaft opening 34 on each of the lateral covers 3 can be provided with an end of a shaft 7, whereas another end thereof is assembled with the shaft opening 34 of the other lateral cover 3. Further, the intercommunicated pipes 5 of the aforesaid planting structures 1 can be further provided with a connection tube 8 so as to enable the canal 221 of each of the planting structures 1 to be intercommunicated, thus realizing the features of being light in weight and easy to assemble and operate. The length and the arrangement mode thereof can be modified according to requirements without requiring to develop different molds, thus effectively reducing production costs.

While the present invention has been disclosed through the preferred embodiment described above, it should be understood that the embodiment is not intended to be restrictive of the scope of the invention. Modifications may be made in accordance with the idea of the present invention without departing from the spirit and the scope of the present invention, such as: alterations on shapes or arrangement modes thereof, and any changes, modifications and applications equivalent in effect are comprised in the scope of the claims of the present application.

It is of course to be understood that the embodiments described herein is merely illustrative of the principles of the invention and that a wide variety of modifications thereto may be effected by persons skilled in the art without departing from the spirit and scope of the invention as set forth in the following claims.

The invention claimed is:

1. A planting structure, comprising:
 a trough comprising:
  two outer walls,
  an inner wall which is curved, located between the outer walls, and connected to respective top portions of the outer walls,
  a bottom surface which is connected to respective bottom portions of the outer walls,
  a hollow space formed between the outer walls, the inner wall, and the bottom surface; and
  a plurality of lateral plates each having a through hole and each respectively coupled to end edges of the outer walls, the inner wall, and the bottom surface at each end of the trough; and a mesh plate;
 wherein the inner wall has an upper concave surface;
 wherein the trough further comprises:
  a planting space for cultivating plants, and
  a canal;
 wherein the mesh plate is mounted across the upper concave surface of the inner wall and separates the upper concave surface of the inner wall into an upper region forming the planting space and a lower region forming the canal;

wherein each of the through holes is located at a position of the canal when the lateral plates are coupled to the trough such that there is fluid communication between the canal and outer environment.

2. The planting structure of claim 1, wherein the trough is integrally formed from a plastic material.

3. The planting structure of claim 1, wherein the trough is integrally formed from a foamed material.

4. The planting structure of claim 1, wherein a plurality of recessed portions are formed on surfaces of the outer walls.

5. The planting structure of claim 1, wherein the trough and the lateral plates are integrally formed.

6. The planting structure of claim 1, wherein an intercommunicated pipe extends through both of the through holes.

7. The planting structure of claim 6, wherein the intercommunicated pipe has a connection tube provided thereon.

8. The planting structure of claim 1, wherein a plurality of bottom grooves are formed on the bottom surface.

9. The planting structure of claim 8, further comprising:
a plurality of intercommunicated grooves formed on positions of the lateral plates facing the bottom grooves,
a plurality of transverse rods, wherein each of the transverse rods has one end disposed in each of the intercommunicated grooves, and the transverse rods are assembled with the bottom grooves and the other end of each of the transverse rods is disposed in the intercommunicated groove of the other lateral plate of the trough at the same time.

10. The planting structure of claim 9, wherein at least one lateral groove is formed between bottom portions of the outer walls on two sides, and the at least one lateral groove is configured to be mutually intersected with the intercommunicated groove.

11. The planting structure of claim 1, wherein a plurality of top grooves are formed on each of the lateral plates.

12. The planting structure of claim 11, wherein each of the top grooves is provided with a sprinkling pipeline.

13. The planting structure of claim 1, wherein each of the lateral plates has at least one shaft opening formed thereon, the shaft opening of one of the lateral plates is provided with an end of a shaft, and another end of the shaft is assembled with the shaft opening of another one of the lateral plates.

14. The planting structure of claim 1, wherein each of the lateral plates has at least one transverse opening formed thereon, the transverse opening of one of the lateral plates is provided with an end of a transverse rod, and another end of the transverse rod is assembled with the transverse opening of another one of the lateral plates.

15. The planting structure of claim 1, wherein each of the lateral covers has at least one lateral recessed groove formed thereon.

16. The planting structure of claim 1, wherein an intercommunicated duct is formed between the canal and the planting space.

* * * * *